(12) United States Patent
Werfel et al.

(10) Patent No.: US 6,365,997 B1
(45) Date of Patent: Apr. 2, 2002

(54) MAGNETIC BEARING AND ITS USE

(76) Inventors: Frank Werfel, Heilemannstrasse 12, D-04277 Leipzig; Christhard Deter, Brehmstrasse 27, D-07548 Gera, both of (DE)

( * ) Notice: Subject to any disclaimer, the term of this patent is extended or adjusted under 35 U.S.C. 154(b) by 0 days.

(21) Appl. No.: 09/581,490
(22) PCT Filed: Oct. 14, 1999
(86) PCT No.: PCT/EP99/07753
  § 371 Date: Sep. 5, 2000
  § 102(e) Date: Sep. 5, 2000
(87) PCT Pub. No.: WO00/22311
  PCT Pub. Date: Apr. 20, 2000

(30) Foreign Application Priority Data

Oct. 14, 1998 (DE) .......................... 198 47 347

(51) Int. Cl.⁷ ............................. H02K 7/09; F16C 39/06
(52) U.S. Cl. ...................... 310/90.5; 359/200; 505/166; 505/879
(58) Field of Search ......................... 300/90.5; 505/100, 505/166, 876, 879, 125; 359/200

(56) References Cited

U.S. PATENT DOCUMENTS

| | | | |
|---|---|---|---|
| 3,026,151 A | 3/1962 | Buchhold | 310/90.5 |
| 4,726,640 A | 2/1988 | Iwama et al. | 310/90.5 |
| 4,939,120 A | 7/1990 | Moon | 74/572 |
| 4,956,571 A | 9/1990 | Gordon | 505/166 |
| 5,171,984 A | 12/1992 | Van Rosmalen | 250/236 |
| 5,177,387 A | 1/1993 | McMichael | 310/90.5 |
| 5,196,748 A | 3/1993 | Rigney | 310/90.5 |
| 5,235,454 A | 8/1993 | Iwasaki | 310/90.5 |
| 5,270,601 A | 12/1993 | Rigney, II | 310/90.5 |
| 5,325,006 A | 6/1994 | Uno et al. | 310/90 |
| 5,540,116 A | 7/1996 | Hull | 310/90.5 |

FOREIGN PATENT DOCUMENTS

| | | | |
|---|---|---|---|
| DE | 33 25 984 | 2/1984 | |
| EP | 0 459 585 A1 | 12/1991 | G11B/7/08 |
| EP | 0 467 341 | 1/1992 | |
| WO | WO 95/12831 | 5/1995 | G02B/26/10 |

OTHER PUBLICATIONS

*English Abstract of WO 95/12831.
XP000307397 / Cryogenics, GB, IPC Science and Technology Press Ltd. Guildford, Jan. 1, 1992, pp. 628–633 "A New Type of Superconducting Journal Bearing Using High $T_c$ Superconductors" Komori, et al.
XP000498906 / Applied Superconductivity, GB, Pergamon Press, Exeter, Jul. 1, 1994, pp. 465–478 "Remanent Induction and Levitation Force of Melt Textured YBCO" Gawalek, et al.
Inst. Phys. Conf. Ser. No. 158 IOP Publishing Ltd., 1997, pp. 821–824 "YBaCuO Large Scale Melt Texturing in a Temperature Gradient", Werfel, et al.

Primary Examiner—Burton S. Mullins
(74) Attorney, Agent, or Firm—Reed Smith LLP (57) ABSTRACT

In a magnetic bearing in which a first part is mounted magnetically relative to a second part and the second part has a Type II superconducting material containing an anisotropic crystal or a plurality of grains formed of this anisotropic crystal, this crystal being anisotropic in that the superconducting current flows in current-carrying planes, the first part has a configuration of magnets with which the superconducting material interacts, and the crystal itself or the crystal in the plurality of grains faces the first part with the normals on the current-carrying planes.

37 Claims, 10 Drawing Sheets

MAGNETIC BEARING AND ITS USE

BACKGROUND OF THE INVENTION a) Field of the Invention

The invention is directed to a magnetic bearing in which a first part is mounted magnetically relative to a second part and the second part has a Type II superconducting material containing an anisotropic crystal or a plurality of grains formed of this anisotropic crystal, this crystal being anisotropic in that the superconducting current is guided in current-carrying planes. The invention is further directed to a motor with a magnetic bearing of this kind and to the use of this motor as a drive for a polygon mirror.

b) Description of the Related Art

The projection of video images by means of light beams, especially laser beams, is a technically demanding task which could not previously be carried out satisfactorily in every detail. One problem consists in manufacturing the individual components more economically than was previously done.

In this technique, a parallel light bundle, a light beam or laser beam, is acted upon by the image and color information of different image points of a video image which are illuminated on a screen sequentially by means of the light bundle in a manner analogous to the conventional representation of video images with electron tubes. The deflecting speeds for the light bundles are extremely high due to the large number of image points.

A rotating polygon mirror is often used for for horizontal or line deflection; the rate of rotation of the polygon mirror multiplied by the number of polygon sides gives the quantity of image points that can be displayed per unit of time. However, given conventional television standards, this requires far more than 100,000 revolutions per minute of the polygon mirror.

At such high rates of rotation, it is beneficial when the polygon mirror is mounted so as to be free of friction as far as possible. For this purpose, gas bearings or magnetic bearings are known from the prior art.

Of special interest among the magnetic bearings are superconducting magnetic bearings in which magnetic fields can be maintained without electrical power. In particular, the anchoring of the magnetic field, namely, the suspension or hovering of a magnet over a superconductor similar to the known Meissner-Ochsenfeld effect, allows a surprisingly simple construction of magnetic bearings.

Through the development of high-temperature superconducting materials, it has become possible to operate such magnetic bearings at the temperature of liquid nitrogen, so that expenditure was substantially reduced compared to superconductors cooled by liquid helium. The term "high-temperature superconducting" is used in its shortened form "superconducting" hereinafter.

U.S. Pat No. 4,956,571 discloses a superconducting magnetic bearing with a conical stator part which is made of a superconducting material and a corresponding, likewise conical, rotor part having permanent magnets. The stator part has a liquid vessel for the liquid nitrogen that is used as coolant.

U.S. Pat No. 5,540,116 describes a superconducting bearing in which a ring, a cap or a disk serves to reduce the magnetic resistance for increasing the forces for free levitation.

The superconducting magnetic bearing in U.S. Pat No. 5,177,387 has radially distributed permanent magnets. Associated permanent magnets of a bearing point are arranged with their poles oppositely aligned and correspond with superconducting materials. The polarity of the permanent magnets is axially oriented.

A superconducting magnetic bearing whose permanent magnet poles are arranged at the ends of a rod is known from U.S. Pat No. 4,939,120. A part made of superconducting material is provided near each end of the rod. Additional magnets corresponding with stationary driving coils are used for the drive.

U.S. Pat No. 5,196,748 describes a superconducting magnetic bearing in which annular and disk-shaped permanent magnets are stacked in like polarity on a shaft. This shaft forms the rotational axis of the bearing and the permanent magnets are magnetized in axial direction. Layers of highly permeable metal, e.g., known mu metal, through which the magnetic flux lines are guided are arranged between the permanent magnets. The stiffness of the bearing is increased somewhat compared to the solutions mentioned above by means of this metal. Further, this reference also describes a bearing showing the arrangement of the permanent magnets and highly permeable layers in radial alignment.

A fundamental defect in the prior art mentioned above is the absence of any teaching for an exact arrangement of magnets individually or collectively, how this bearing should be designed so as to be suitable for controlling polygon mirrors, and which arrangements would be best for this purpose. In this case, the quantities considered for optimization are, first, the bearing capacity, that is, essentially the force for holding, e.g., a rotor in a motor over a stator made from superconducting material; second, the attainable stiffness, i.e., the magnitude of restoring forces acting on the rotor when the rotating shaft is displaced from its rest position; and, third, the bearing damping which essentially determines the restoring time when deflecting from the optimum rotationally symmetric configuration and which should be large enough to prevent swiveling about the rotating shaft when restoring.

Stiffness and bearing damping could be influenced, for example, by intermediate layers such as mu metal layers according to U.S. Pat No. 5,196,748, wherein the bearing capacity is also possibly reduced. Therefore, increasing the bearing capacity should be the most important criterion for optimizing.

For this purpose, special materials could be selected by which high bearing capacities could also be achieved in principle.

A crystalline material whose crystal orientation can be aligned based on its anisotropic behavior by a special temperature process is described, for example, in the article "YBaCuO Large Scale Melt Texturing in a Temperature Gradient", by F. N. Werfel, U. Flögel-Delor, D. Wippich, Inst. Phys. Conf. Ser. No. 158 IOP Publishing Ltd., 1997, pages 821 to 824. This material is also anisotropic in its superconducting and cryomagnetic properties, wherein the currents flow predominantly in parallel CuO planes in the superconducting state. A magnetic bearing was built by way of experiment by means of this material but is not described more fully.

OBJECT AND SUMMARY OF THE INVENTION

It is the primary object of the invention to provide a magnetic bearing having a simple construction and a high bearing capacity which, in particular, is also large enough that stiffness and bearing damping can be optimized in a simple manner. Further, a motor supported in magnetic bearings is to be provided, which motor can be optimized in accordance with the teaching for the magnetic bearing with respect to bearing capacity, stiffness and bearing damping, specifically in such a way that polygon mirrors for scanning light bundles for the display of video images can be operated at a high rotational speed and with high stability.

This object is met in a magnetic bearing of the type mentioned in the beginning in that the first part has a configuration of magnets with which the superconducting material interacts, and the crystal individually or in the plurality of grains is/are directed toward the first part with the normal or normals on the current-carrying planes.

However, another solution to the proposed object is also achieved by a magnetic bearing in which a first part comprises a configuration of magnets and is mounted magnetically relative to a second part, the second part being a Type II superconducting material with high critical current density which can be cooled appreciably below its critical temperature by means of a connected cooling system, wherein the superconducting material contains a plurality of grains, each comprising an anisotropic crystal; in the superconducting state, the current flowing in it ("superconducting current") flows in every grain in a current-carrying plane of the grain (a-b planes, as they are called), and the superconducting material, in terms of its structure, is a melt-textured multi-grain material with grain sizes in the range of 2 mm to 20 mm, and a preferred direction of the current-carrying planes is adjusted in such a way that an external magnetic flux direction of the magnetic flux lines of the configuration of magnets runs parallel to the normals on the current-carrying planes of the grains.

The selection of a material having the characteristic that current flows predominantly in determined spatial directions is not self-evident. The fact that precisely materials of this kind generally give a higher bearing capacity is surprising, because a degree of freedom, namely, the direction of the normals on the current-carrying planes, is not present, unlike other isotropic materials with three degrees of freedom for current transport. In order to explain this, it is assumed that an anchoring of the magnetic field lines penetrating the material is increased at adhesion centers or pinning centers such as defects, precipitations or interfaces. However, in this respect it is also of decisive importance above all that circulating currents are induced by the external magnetic field in the current-carrying planes generating an opposite-pole magnetic field. This results in an increased bearing capacity due to the diamagnetic properties that are improved by the current-carrying planes.

In a preferred further development of the invention, the bearing capacity can be increased in that the configuration of magnets has a plurality of magnets in series along a shaft, wherein each magnet is oriented with its poles oppositely aligned relative to the next magnet in the series and the normals on the current-carrying planes face this shaft, wherein a distance of at least 0.1 millimeter is provided between the first and second part.

At a lower limit of 0.1 mm for this distance, the magnet arrangement and the superconducting material are safely decoupled. Unexpectedly, a pronounced hovering effect still occurs at distances greater than 0.1 mm and can even be observed in tests at distances of up to 4 cm.

It is well known that superconduction is only possible below a critical magnetic field strength. Two magnets with oppositely aligned poles increases the total magnetic field acting on the superconductor almost by a factor of 2, with the additional result that the magnetic flux exiting radially from the points of abutment of the magnets runs essentially in the direction of the normals on the current-carrying planes.

The magnetic bearings according to the invention can be used in particular as translation bearings and/or rotation bearings. In the case of rotary bearings, e.g., for a motor for driving a polygon mirror, the first part is mounted so as to be rotatable relative to the second part in a further development of the invention, wherein the shaft on which the magnets are arranged in series is the axis of rotation and the normals on the current-carrying planes are directed radial to this axis of rotation.

A good compromise between the attainable bearing capacity, stiffness and damping results in accordance with a preferred further development of the invention in that the minimum distance between the first and second part is between 1 mm and 10 mm, especially between 2 mm and 7 mm. Unexpectedly, it has turned out that the indicated limits are practically independent from the selected materials and other dimensions of the bearing.

For driving a polygon mirror, it is advantageous that the first part is constructed as a rotor and the second part is constructed as a stator of an electric motor.

Damping and stiffness also essentially depend on whether the crystals are single crystals or have a granular structure. With single crystals, the stiffness and levitating force are very high, but damping is low. With very small grain boundaries, the exact opposite is true. It has proven advisable for the bearing characteristics that a remanent state is adjusted, i.e., the best possible anchoring of the frozen magnet flux is achieved. Surprisingly, grain boundaries or internal interfaces can provide for strong anchoring as well as high damping. It has been shown that particularly good damping and stiffness characteristics are achieved when the grains have a grain size in the range of 2 mm to 20 mm.

In a preferred further development of the invention, a crystal which contains or is made of an X-barium-copper-oxygen compound (where X is a rare earth metal from the group Y, Sm, Nd, Tb) is used for the superconducting material. With these materials, the orientation of the crystals which is required according to the invention can be carried out without problems. This is true in particular when, in accordance with a preferred further development of the invention, the crystal is a compound which contains or is made of $Y_x Ba_2Cu_3O_{(7-\delta)}$, where $1 \leq x \leq 1.6$ and $0.01 < \delta < 0.10$.

As is well known, the superconducting effect is first brought about at low temperatures which are normally achieved by cooling with liquid nitrogen that has to be replenished when used up. According to an advantageous further development of the invention, however, a small refrigeration machine is provided as a cooling system, preferably a Stirling engine which is especially advantageous due to its high efficiency.

A Stirling engine used in experiments with 2.5 watts of cooling power at a temperature of 80° K. was sufficient for cooling the second part. It had an electric power consumption of about 40 W which is entirely adequate, e.g., for operation of a bearing for a polygon mirror. This enables a continuous operation without having to be continually refilled with nitrogen. Use of a magnetic bearing of this kind to operate a polygon mirror in a video projector is remarkably advantageous. In addition, a refrigeration machine makes it possible to operate the stator at lower temperatures compared to 77° K. in the case of liquid nitrogen.

In order to increase stability, it has turned out to be particularly advantageous when the first and second part in a preferred further development of the invention are enclosed by an air-tight housing which is preferably evacuated until reaching a pressure of less than $10^{-4}$ Pa.

The molecular friction can be further reduced by altering the gas composition in the housing, wherein the housing is filled with a gas having a molecular weight of less than 28, e.g., with helium.

According to another advantageous further development of the invention, the magnets in the first part are permanent magnets, so that the cooling power that must be provided in operation of the bearing is lower compared with the use of electromagnets which heat up.

A motor according to the invention with a magnetic bearing of this kind in which a rotor is mounted relative to a stator magnet is characterized in that the stator, as second part of the magnetic bearing, is a Type II superconducting material which contains an anisotropic crystal or a plurality of grains formed of the latter, wherein the superconducting current flows in current-carrying planes of the crystal or grains, and the crystal (or all crystals in case of a plurality of grains) is (are) oriented parallel to the normal or normals on the current-carrying plane(s) to the axis of rotation of the rotor as first part of the magnetic bearing.

A motor of this type is especially suited as a drive for a polygon mirror which is fastened to the rotating shaft of the motor. A housing is advantageously provided, wherein the polygon mirror is used in a video system in which a light bundle is scanned cyclically with respect to time and the housing encloses the bearing as well as the polygon mirror and has one or two windows for the entrance and exit of the scanning light.

The invention provides a superconducting magnetic bearing which can be used as a translation bearing or as a rotation bearing or axial bearing and essentially comprises the following components:

A first element, the above-mentioned second part, and a superconducting material which can be cooled to appreciably below the critical temperature by a connected cooling system; and A second element, the above-mentioned first part, having permanent-magnetic characteristics at least in some areas, wherein the superconducting material of the first element interacts magnetically with at least one surface of the second element in its area with permanent-magnetic characteristics.

In this connection, the superconductor should be a melt-textured material with high critical current density which, with respect to its structure, is a multigrain material and, with respect to its magnetic properties, a multidomain material with grain sizes ranging from 2 millimeters to 20 millimeters, wherein an orientation of the domains according to current-carrying a-b planes is effected on the anisotropic superconducting material and a preferred orientation is adjusted in such a way that the magnetic flux lines of the permanent-magnetic material are oriented parallel to the normals on the current-carrying a-b planes.

The magnetically active domains, interacting with the permanent-magnetic material of the second element, generate previously unheard of high damping with sufficient bearing capacity of the magnetic bearing at the same time, which is extremely advantageous for technological application, especially with unbalanced rotors.

The crystalline structure of the superconducting material and its anisotropic electromagnetic and mechanical properties result in substantial advantages. In particular, the special manufacturing process described in the article by Werfel at al. can be applied in this case, wherein, by applying local temperature gradients, the crystals in the superconducting material are given a preferred direction which is oriented to the current-carrying a-b planes of the crystal lattice and, according to the invention, is determined in that the normal of the current-carrying a-b planes of the crystals, the c-axis, as it is called, is extensively parallel to the external magnetic flux direction of the second element. In practice, it was shown that virtually 90% of the crystallites of a superconducting material can be oriented with respect to the c-axis with a deviation of ±10 degrees. It is also possible to join individually grown single crystals according to their orientation or to etch structures in a single crystal located on a substrate.

In the case of rotary bearings, the invention, in combination with preferably axially polarized permanent magnets, has a much higher magnetic flux anchoring compared to known bearings so that it was possible to increase the stiffness of the magnetic bearing by a factor of approximately $3_1$ (measured in a specific construction). In this respect, a comparatively high damping is also observable. These properties can be attributed in particular to the corresponding structure formation of the material with respect to the crystal boundaries or domain boundaries in the range indicated above and an excellent damping behavior of the superconducting magnetic bearings which is suitable for polygon mirrors can be adjusted. For a rotary bearing, the first element can be, for example, cylindrical or hollow-cylindrical or can be machined in a hollow-cylindrical shape, for example, in a tulip-shaped manner.

A permanent-magnetic part, preferably in disk-shape with axial magnetization with which disk-shaped and ring-shaped permanent magnets can be produced and magnetized in a simple and/or economical manner, is preferred for the second element.

In this regard, the following constructions are particularly advisable:

the permanent magnet is a permanent-magnetic ring;
a plurality of axially polarized, radially symmetric, permanent-magnetic rings are layered or stacked in axial direction;
a plurality of axially polarized, radially symmetric, permanent-magnetic rings are stacked with their poles oppositely aligned in axial direction.

In order to improve the stiffness of the bearing, permeable ring disks can be arranged between the stacked permanent-magnetic rings for homogenizing and guiding the magnetic flux. Mu metal, for example, is suited to this purpose and is also particularly favorable for true-running characteristics of a rotary bearing. Such ring disks should have a thickness between 0.5 mm and 5 mm which increases with the size of the gap between the stator part and rotor part.

Because of the high rotational speeds that are required, it is advisable to produce the rotor part from a material with high tensile strength and low density. Aluminum, titanium or alloys thereof are suited to this purpose.

The following advantageous constructions are possible:

The second element with the permanent magnet, as a rotor part, can be constructed from a nonmagnetic central area and permanent-magnetic rings fastened thereto. In this connection, the central area should be made from a very robust material which is not magnetizable, e.g., titanium. However, magnetizable materials such as steel alloys can also be used. For increased tear resistance, it is then also especially favorable when the permanent-magnetic rings are formed of a hard-magnetic material such as SmCo or NdFeB which is reinforced with carbon fibers.

All of these constructions can be used advantageously in the motor according to the invention. A drive coil system of a motor of this type is arranged with respect to the permanent-magnetic area required for the bearing support of the rotor in such a way that there is an interaction between the permanent-magnetic area and the coils, wherein asymmetries of the permanent-magnetic field and/or eddy currents in the rotor part are used for transmission of torque. In this respect, the drive coil system of the stator part with the permanent-magnetic fields of the rotor part can form a non-commutator DC drive or an AC drive, for example, as a short-circuit rotor or hysteresis drive.

In the following, the invention will be explained more fully in principle by way of example with reference to the drawing.

DESCRIPTION OF THE PREFERRED EMBODIMENTS

Figure 1:
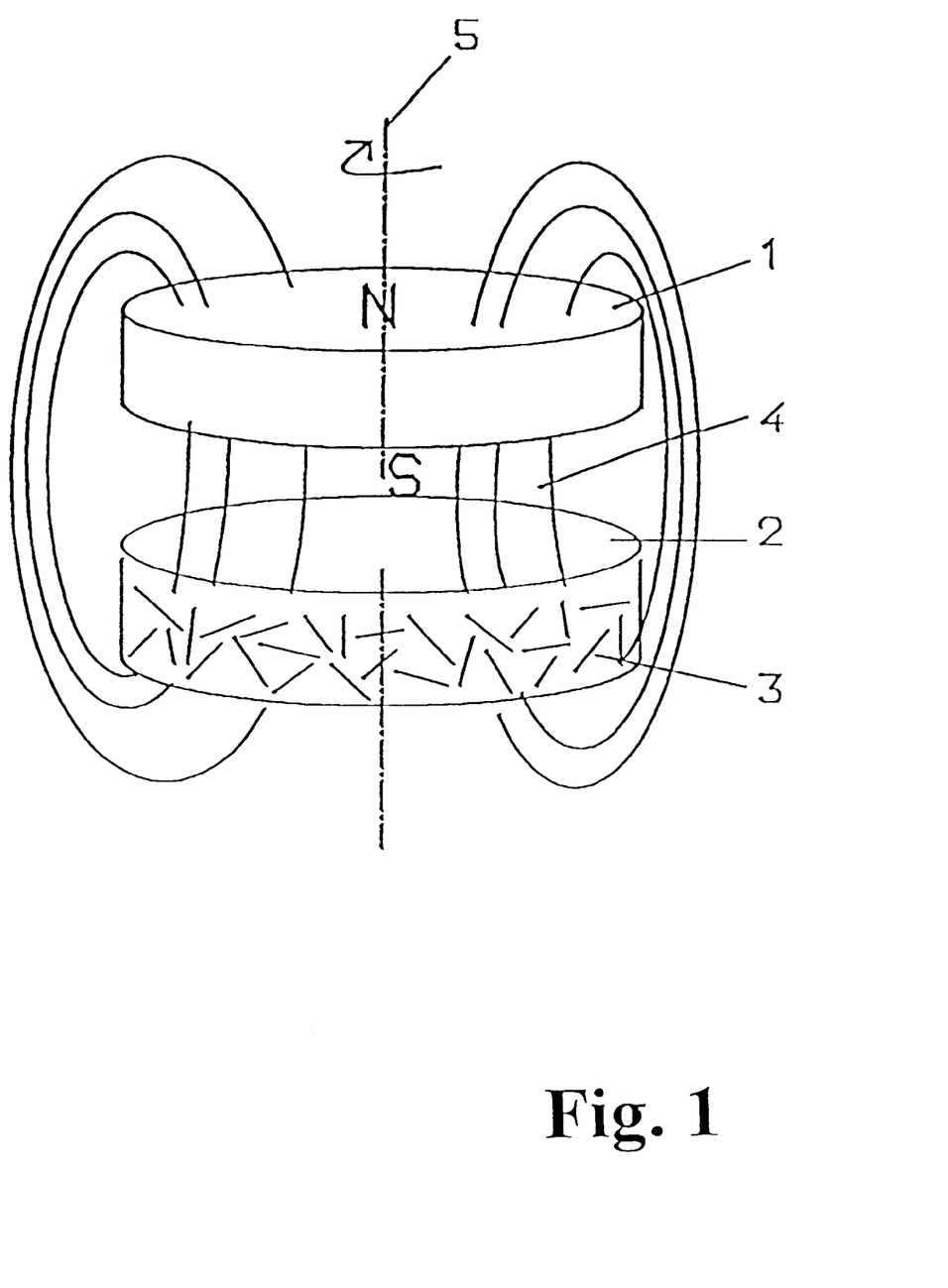
FIG. 1 is a schematic view for explaining the interaction of a permanent magnet with a superconductor in axial geometry.

FIG. 1 shows the principle of the interaction of a permanent magnet 1 magnetized in axial direction with a part 3 which is produced from a superconducting material 2. The lines in different directions in part 3 are intended to illustrate schematically that the crystal directions are randomly oriented.

The permanent magnet 1 is arranged above a surface of the superconducting material 2 which is cooled to below its critical temperature during operation of the bearing, that is, in the state shown in FIG. 1. The magnetic field lines of the permanent magnet 1 generate currents which build a magnetic field directed opposite to the permanent magnet 1. This results in a force effect which allows the permanent magnet 1 to hover above the superconducting material 2.

The induced magnetic fields generate a force which is greater than the weight of the permanent magnet 1 and which holds the latter at a distance from the superconducting material 2. Lateral movements as well as rotating movements about an axis of rotation are possible given a suitable shaping of the magnet I and material 2.

In the example shown in FIG. 1, however, a rotational degree of freedom about an axis of rotation is determined by the symmetry with respect to rotation of the magnetic field of the permanent magnet 1 and of the anchoring of the magnetic field lines. In this respect, the permanent magnet 1 forms a rotor part and the superconducting material 2 forms a stator part 3 which are separated from one another by a gap 4. The gap width is determined by the so-called frozen field condition, so that the size of the gap adjusted when the superconductor is cooled is permanently maintained.

The permanent magnet 1 rotates according to the effect of external forces virtually without friction over the superconducting material 2. The air friction, however, can cause friction losses at higher rotational speeds. Because of the reduced gas friction, a vacuum of better than $10^{-1}$ Pa is advisably adjusted between the stationary and rotating parts especially for high rotational speeds. Further, to reduce the air friction, the permanent magnet 1 and the superconducting part 3 can also be mounted in a housing which is filled with a gas that has a greater sound velocity than air. Above all, gases with low molecular weight are suitable for this purpose; in particular, helium has turned out to be especially advantageous.

All of the following embodiment examples can be accommodated in a housing, not shown, when used, for example, to drive a polygon mirror in video technology. In this case, it is advantageous that a polygon mirror supported by the bearing is also accommodated in the housing to reduce friction, wherein windows are then provided in the housing for the scanning light bundle to enter and exit. While the windows required for this purpose are more costly compared to mounting the polygon mirror outside of the housing, the advantage of lower friction losses with the polygon mirror as well, and the independent running with respect to movements of the surrounding air, have proven to be a great advantage. Rotational speeds greater than 120,000 RPM even require an evacuated environment.

Figure 2:
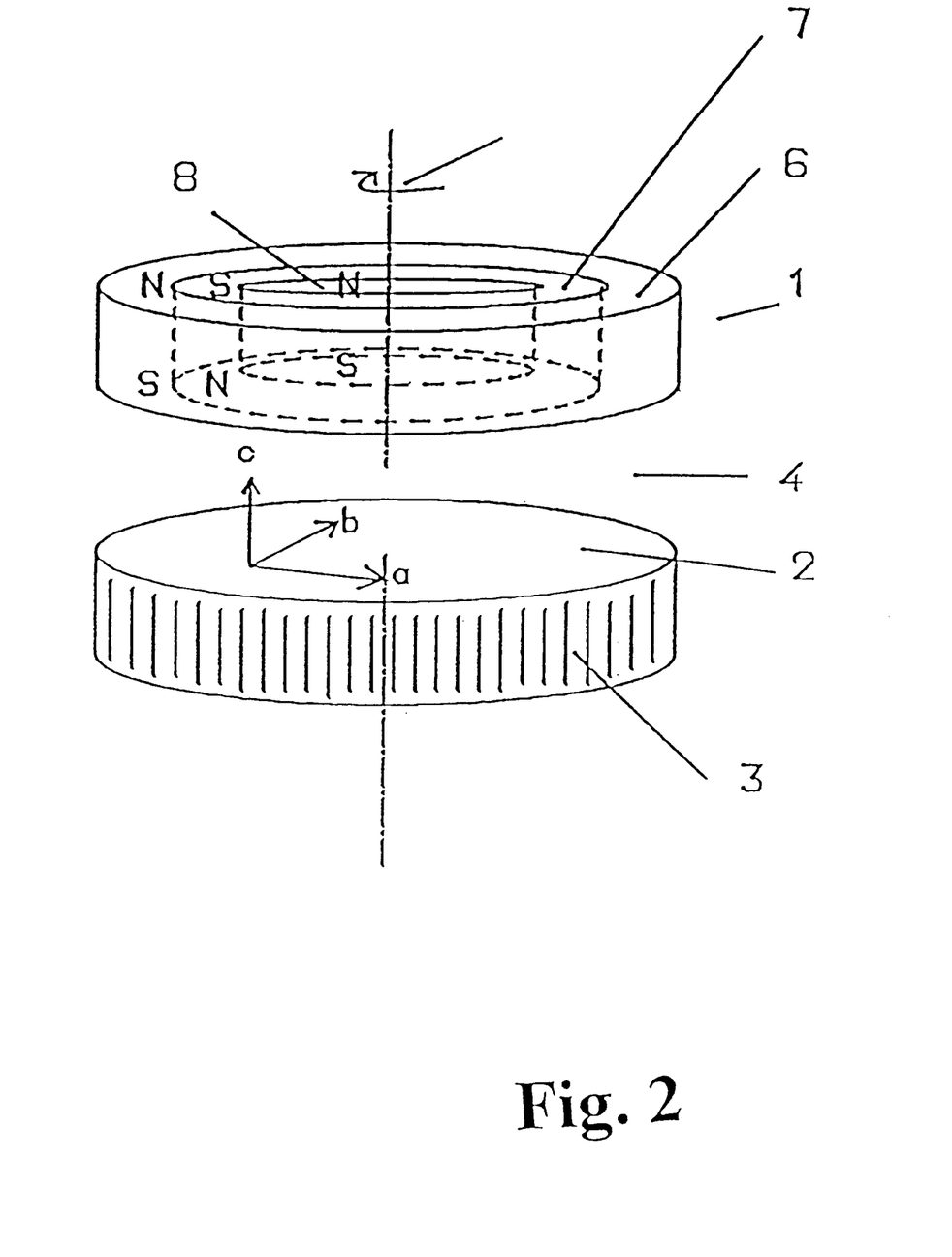
FIG. 2 is a schematic view of the axial geometry of a superconducting magnetic bearing with textured superconducting material.

The invention will now be explained more fully with reference to FIG. 2. The superconducting material 2 is a melt-textured multidomain material with high critical current density. Further, FIG. 2 shows crystal axes a, b and c, wherein the surface encompassed by the axes a and b carries the superconducting current and allows the greatest magnetization. As is indicated by the lines in the material 2 in FIG. 2, the crystallites in the superconducting material 2 are oriented in such a way that the normals extend parallel to the axis of rotation 5 on the current-carrying planes.

Because of the anisotropic physical behavior of the superconducting material 2, the superconducting currents are preferably generated in the a-b planes of the crystal which are aligned virtually in the same direction. In this respect, it has been shown that it is possible to achieve a higher magnetization compared with the prior art; this also increases the bearing capacity as well as the stiffness of the magnetic bearing compared with those with random crystals as will be made clearer subsequently with reference to FIG. 5.

When the crystals are very small, the superconducting currents are damped by the grain boundaries, so that a corresponding damping of a magnetic bearing can also be adjusted by means of the average grain sizes of the crystallites. A damping of this kind is advisable so that only a very quickly decaying oscillation, if any, occurs when there is a deviation of the axis of rotation from the predetermined position and a restoring, especially when attaining critical rotational speeds due to the forces determining stiffness. Appropriate grain sizes of the crystallites were already mentioned above. In particular, it has turned out that advantageous damping should be on the order of 8 mm especially when using the bearing, shown schematically in FIG. 4, in a motor for driving a polygon mirror.

In this context, it is noted once again that the arrangement of the permanent magnet 1 as a rotor part and the superconducting material 2 as a stator part is particularly favorable; because of this, the stator part can be cooled in a particularly simple manner. In the embodiment examples, a small refrigeration machine in the form of a Stirling engine with 25 watts/80° K. or an arrangement operated by liquid nitrogen is used for this purpose.

Further, it can be seen from FIG. 2 that the rotor part is formed of three cylindrical permanent rings 6, 7, 8 arranged with poles oppositely aligned. The resulting magnetic field configuration generates high field gradients at the polarity boundaries NS and SN in the superconductor 2. These are extremely advantageous above all for the desired stiffness, i.e., the return of the rotor 1 to the desired axis of rotation 5 after deflection due to disturbances.

Figure 3:
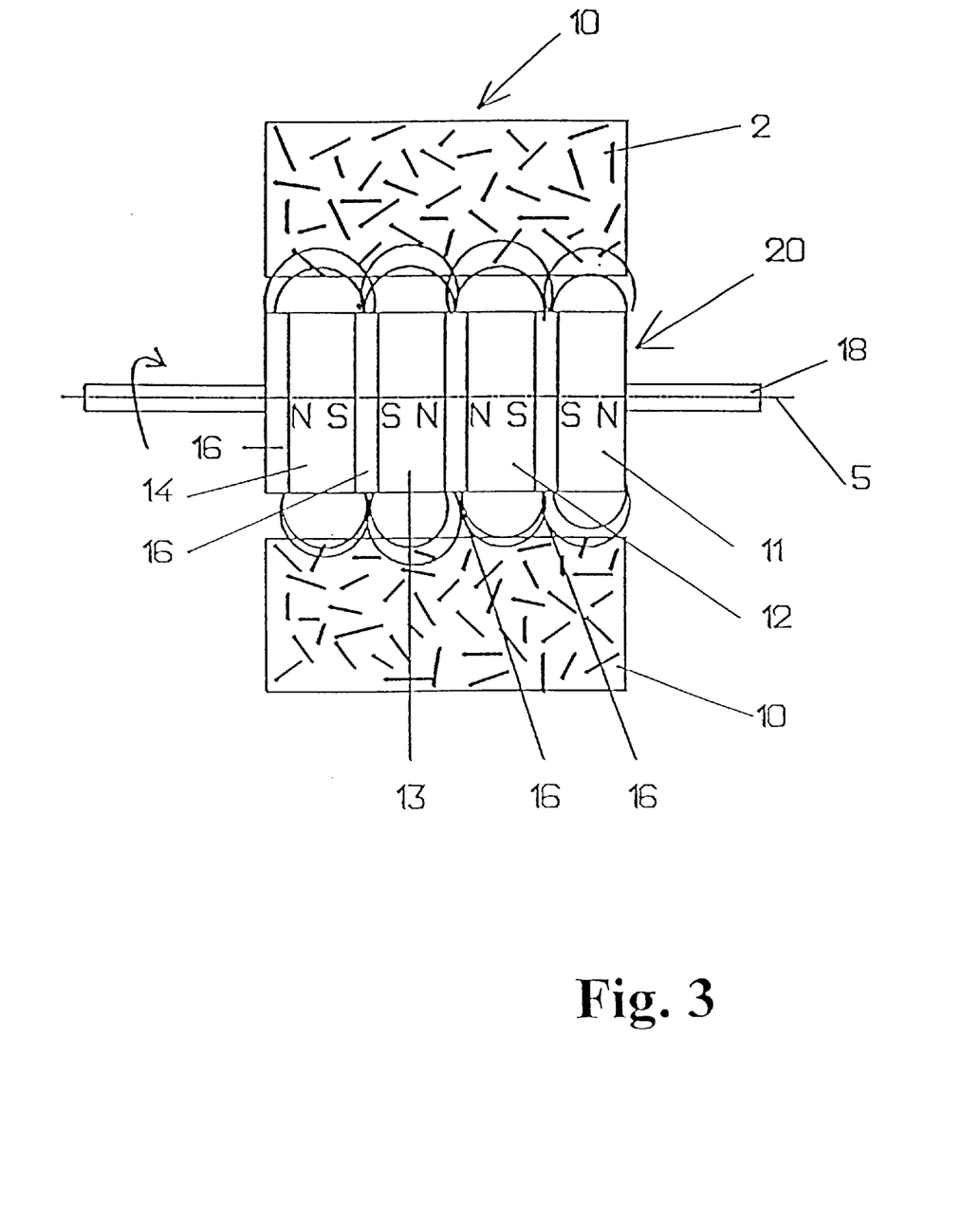
FIG. 3 shows an embodiment example for a radial magnetic bearing with a superconducting stator part according to the prior art.

FIG. 3 shows, as a further example, a rotary bearing in radial geometry such as can be realized with magnetic materials according to the prior art. The superconducting material 2 forms the stator part 10 which is formed of a superconducting cylinder or ring and is cooled. A system of laminated or stacked permanent magnetic rings 11, 12, 13, 14 and intermediate rings 16 is fastened to a shaft 18 and forms the rotor part 20 with the axis of rotation 5. As can be seen from FIG. 3, the axially magnetized permanent magnetic rings 11, 12, 13, 14 are arranged with oppositely aligned poles with respect to their neighbor and accordingly increase the radial magnetic flux to twice the value of the single magnet.

In the embodiment example shown, the intermediate rings 16 are made of highly permeable material, especially from soft iron, which causes a field guiding and a homogenizing of the magnetic field of the permanent magnets 11, 12, 13, 14. The shaft 18 is made of a nonmagnetic material. The optimal thickness of the intermediate rings 16 essentially depends on the size of the gap 4 that is also represented in this example. It has turned out that the thickness of the intermediate rings 16 in the embodiment examples should be approximately half of the gap 4. This means that with the 1-mm gap 4 which is usually used the intermediate rings 16 are advisably provided with a thickness of approximately 0.5 mm.

Figure 4:
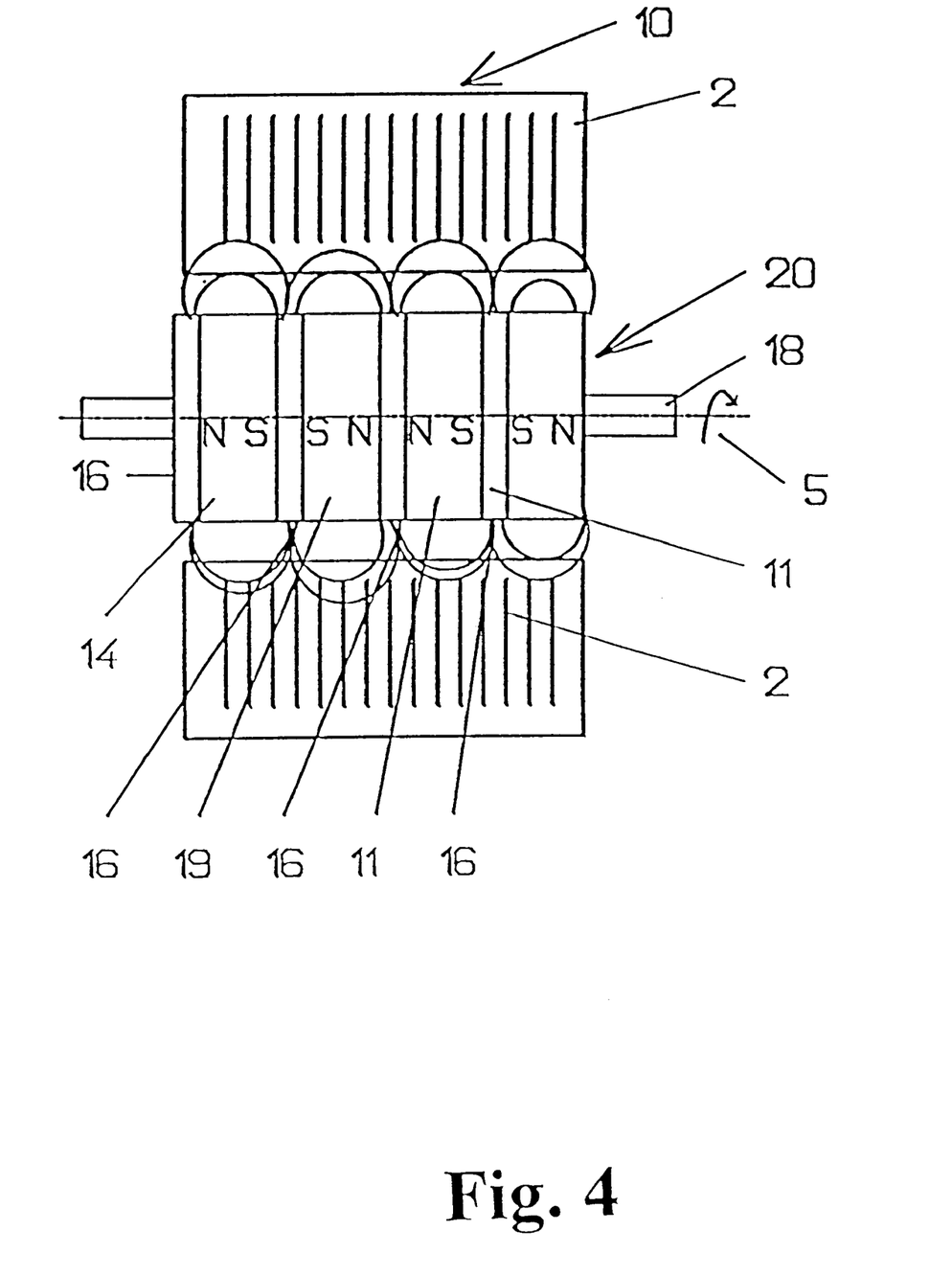
FIG. 4 shows an embodiment example as in FIG. 3, but with optimized bearing capacity, bearing stiffness and damping.

In contrast to FIG. 3, FIG. 4 shows a superconducting radial bearing according to the invention in which the superconducting stator part 10 has a radially symmetric orientation of the superconducting crystallites. By applying positive and negative local temperature gradients in the manufacture of the stator part 10 as a cylindrical molded article, a radial c-axis texture of the superconducting material 2 was realized as is described in the Werfel article. In this case also, due to the preferred direction of the c-axes toward the axis of rotation 5, the higher magnetization compared with the example in FIG. 3 is achieved, which enables an even greater bearing capacity and stiffness for the bearing support of the rotor part 20 relative to the stator part 10 compared with the known solutions. The higher flux anchoring in particular allows miniaturization of noncontacting passive superconducting magnetic bearings.

By changing the symmetric and cyclic arrangement of the intermediate rings 16 and the choice of their thickness, the guiding of the magnetic flux and its anchoring in the superconductor can be adjusted in such a way that a greater radial stiffness is produced at the ends of the shaft corresponding to a virtual two-point bearing support. In this way, a particularly great tilting stiffness of the rotor 6 is made possible.

Figure 5:
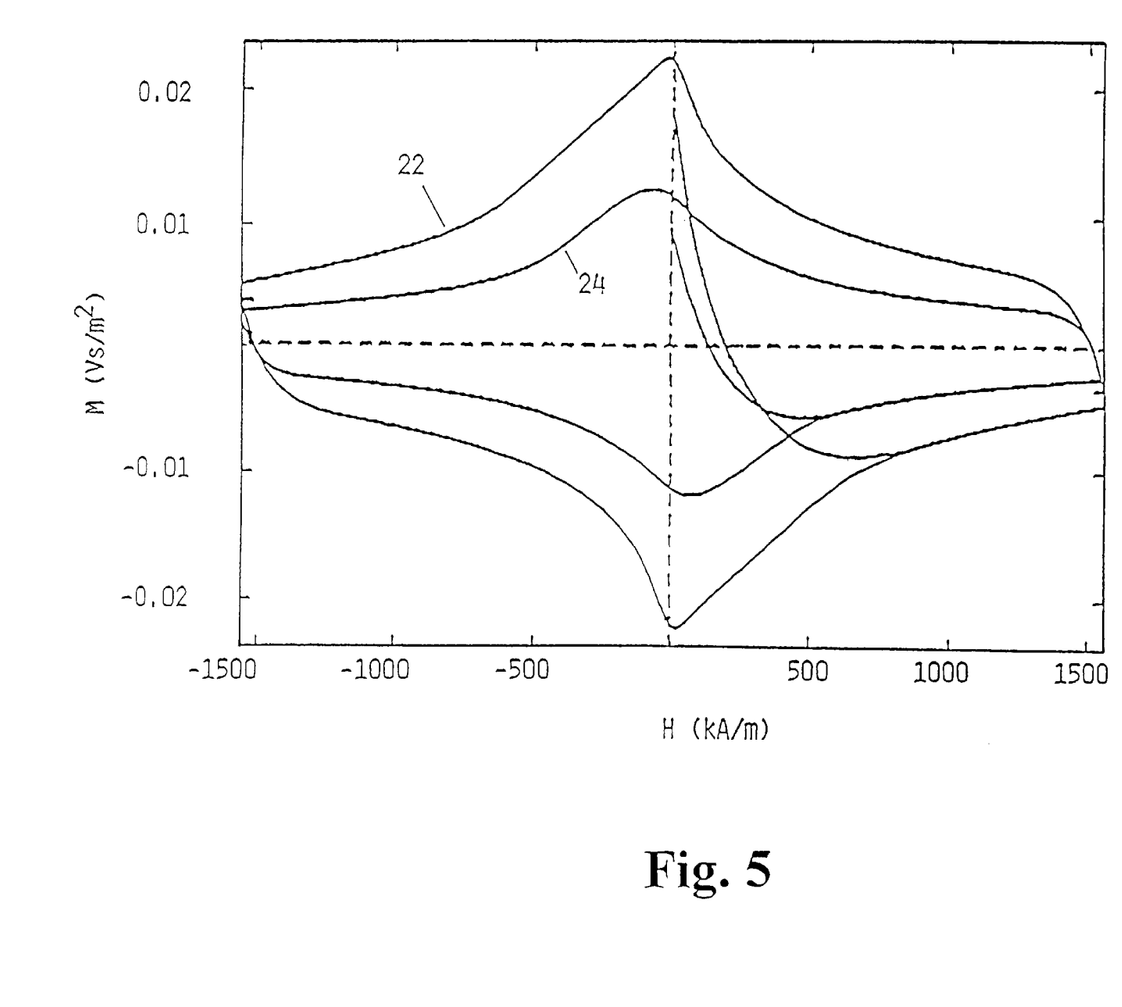
FIG. 5 is a view showing the anisotropic magnetization curve for melt-textured YBaCuO superconductors.

In FIG. 5, the magnetization of a YBaCuO superconductor is shown as a measurement curve of the magnetization m as a function of an external magnetic field H parallel to the crystallographic c-axis corresponding to curve 22 as well as vertical to the crystallographic c-axis corresponding to curve 24. The high maximum magnetization measured according to curve 22 for a magnetic field parallel to the c-axis represents results achieved through experimentation which are advantageously used in this case for high stiffness of superconducting magnetic bearings according to the invention. It has been shown in experimental setups that the damping of the superconducting magnetic bearing that can be achieved at the indicated values is so high that the resonant frequency of unbalanced rotor parts when running up could be safely run through even with a shift in the center of gravity of up to 0.3 mm.

Figure 6:
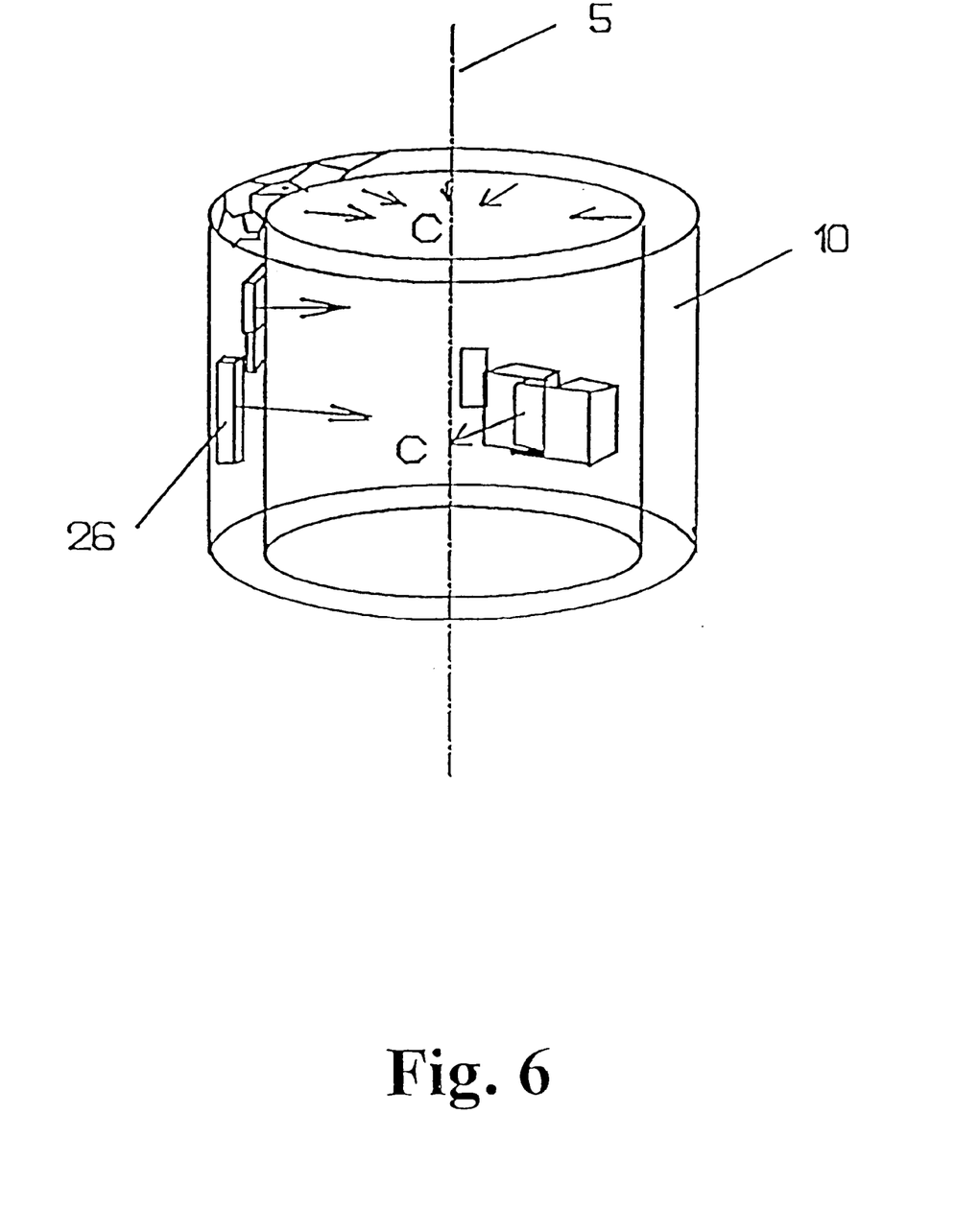
FIG. 6 shows the adjustment of the crystal direction in a cylinder of superconducting material with a radial crystal texture or grain texture.

A cylindrical stator part 10 for a superconducting radial bearing with radial texture is shown schematically once again in FIG. 6. The individual crystallites 26 are oriented by growing with a gradient melt texture.

Figure 7:
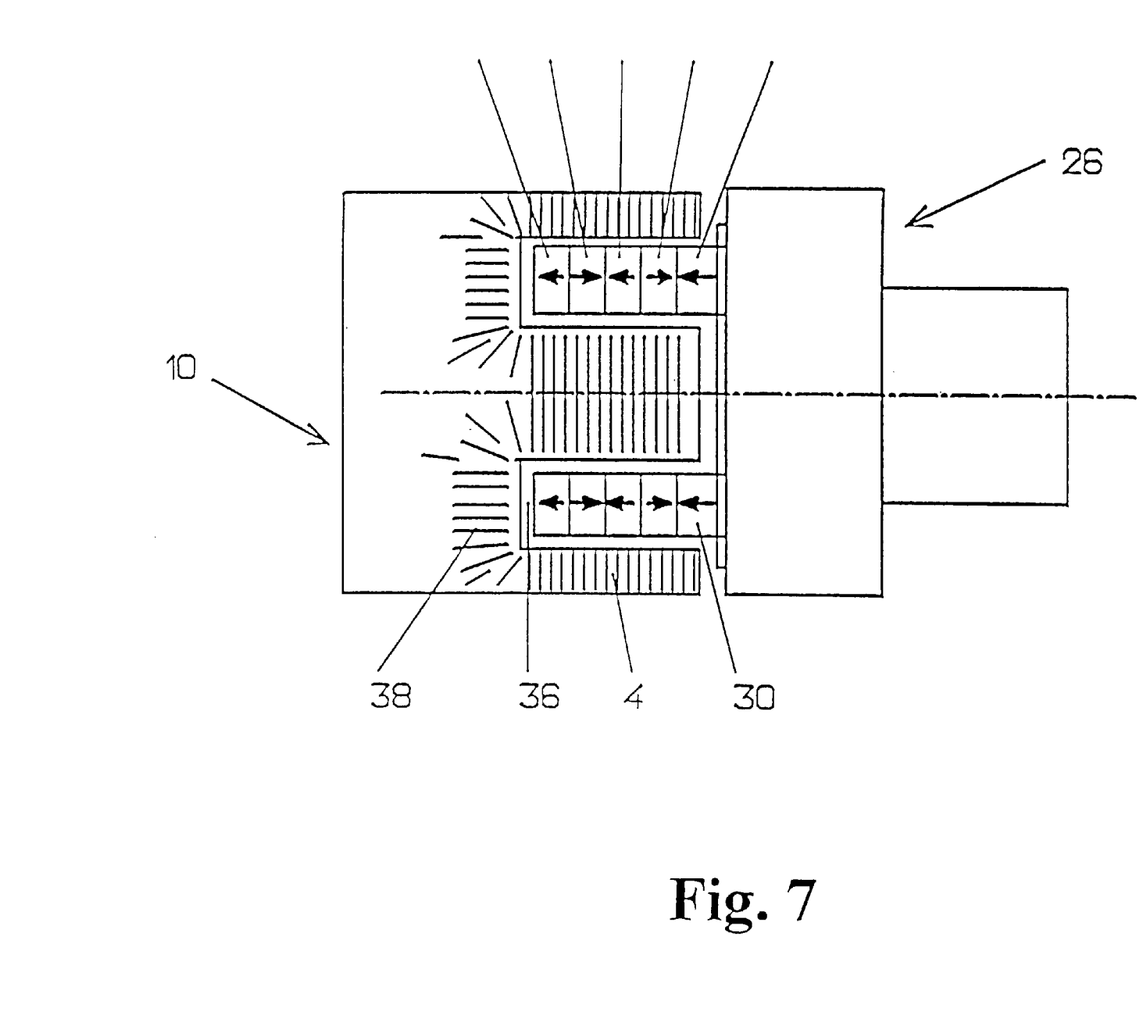
FIG. 7 shows a superconducting radial bearing and axial bearing with an especially great bearing stiffness.

FIG. 7 shows a superconducting magnetic bearing with a rotor part 20 which has permanent-magnetic rings 30, 31, 32, 33, 34 arranged with poles oppositely aligned. The superconducting stator part 10 has a cylindrical cutout 36 in which the permanent-magnetic rings 30, 31, 32, 33, 34 are arranged with a slight clearance 4. The superconducting material of the stator 10 has the radially oriented texture of the crystallites shown in FIG. 6 in the radial direction of the rings 30, 31, 32, 33, 34. In addition, an axial texture is provided in zone 38 of the stator part 10 at the base of the cylindrical cutout. A combination of superconducting radial bearings of this type with additional axial bearing components ensures especially high magnetic bearing forces and stiffness.

Figure 8:
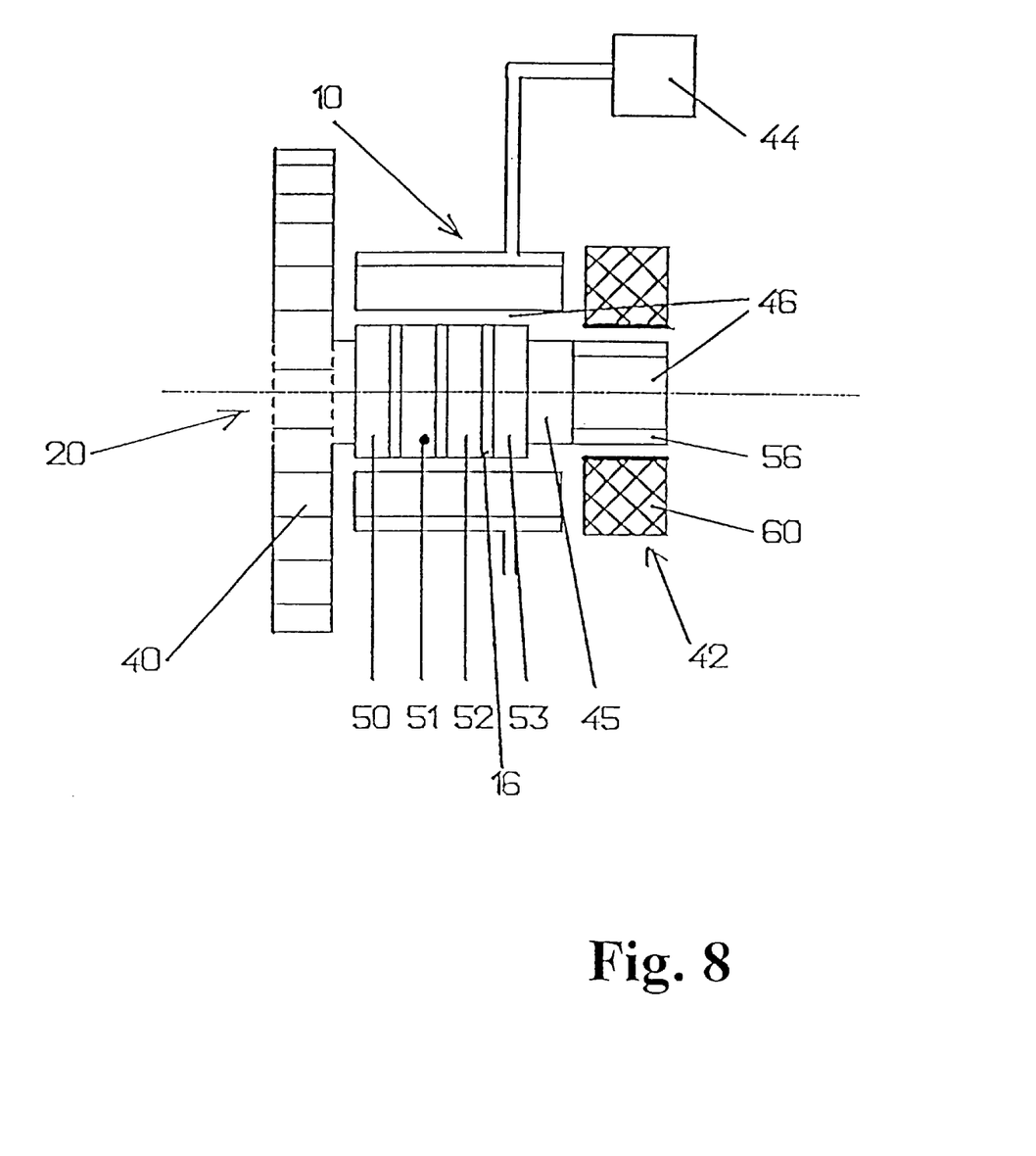
FIG. 8 shows a superconducting bearing in a motor for the drive of a polygon mirror.

An example of a superconducting radial magnetic bearing with a polygon mirror 40 at one end of the bearing and a motor drive 42 at its other end is shown in FIG. 8. The magnetic bearing is formed of a superconducting stator part 10 which is cooled by a connected small cooling engine 44. The rotor part 20 carries a polygon mirror 40 on a shaft 45 of high-strength material on which permanent-magnetic rings 50, 51, 52, 53 are arranged so as to be stacked with poles oppositely aligned, intermediate rings 16 being provided therebetween for radial homogenization of the magnetic fields. The permanent-magnetic rings 50, 51, 52, 53 and the intermediate rings 16 are designed for high rotational speeds and, for this purpose, are preferably reinforced with carbon fibers or Kevlar so that the parts can withstand the centrifugal forces occurring at high rotational speeds.

A rotor part arranged for the motor drive 42 is formed as a short-circuit rotor or as a magnetic rotor 56 at the end of the rotor part 20 located opposite the polygon mirror 40. The corresponding area of the rotor part 20 is enclosed by a stator coil 60.

Figure 9:
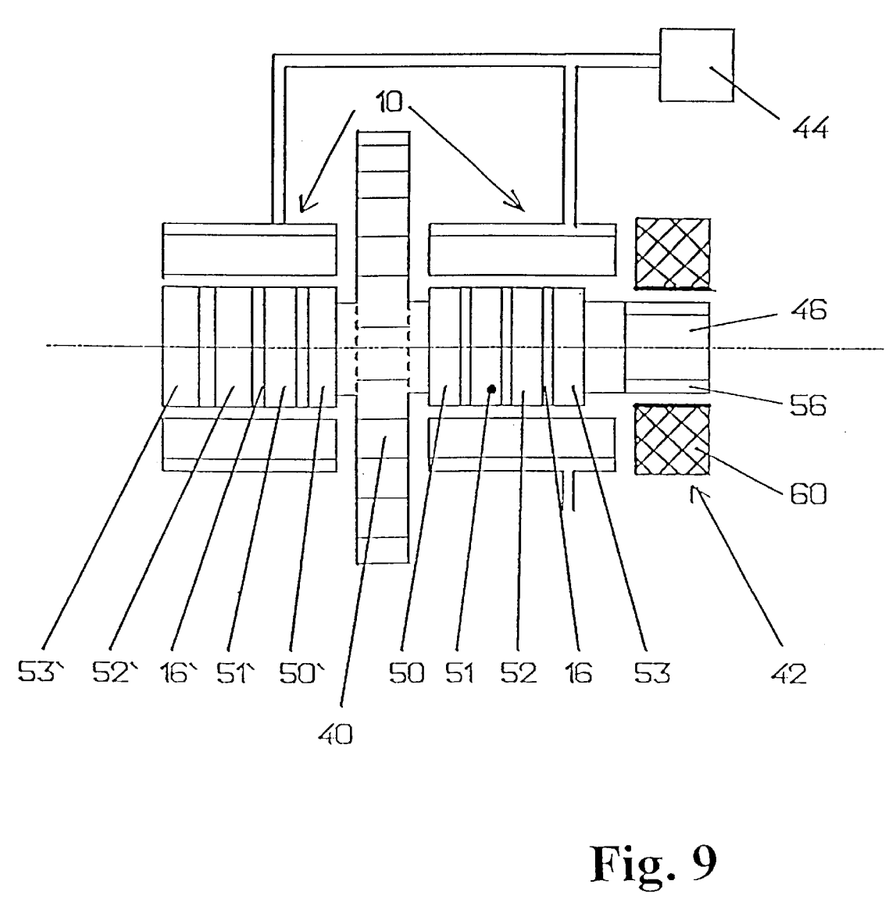
FIG. 9 shows a superconducting bearing similar to that in FIG. 8, but which is constructed as a two-sided radial bearing.

FIG. 9 shows an example of a polygon mirror 40 with two-fold radial bearing support and with a particularly great bearing stiffness which is brought about in that the polygon mirror 40 is arranged symmetrically between two bearing parts according to FIG. 8.

Figure 10:
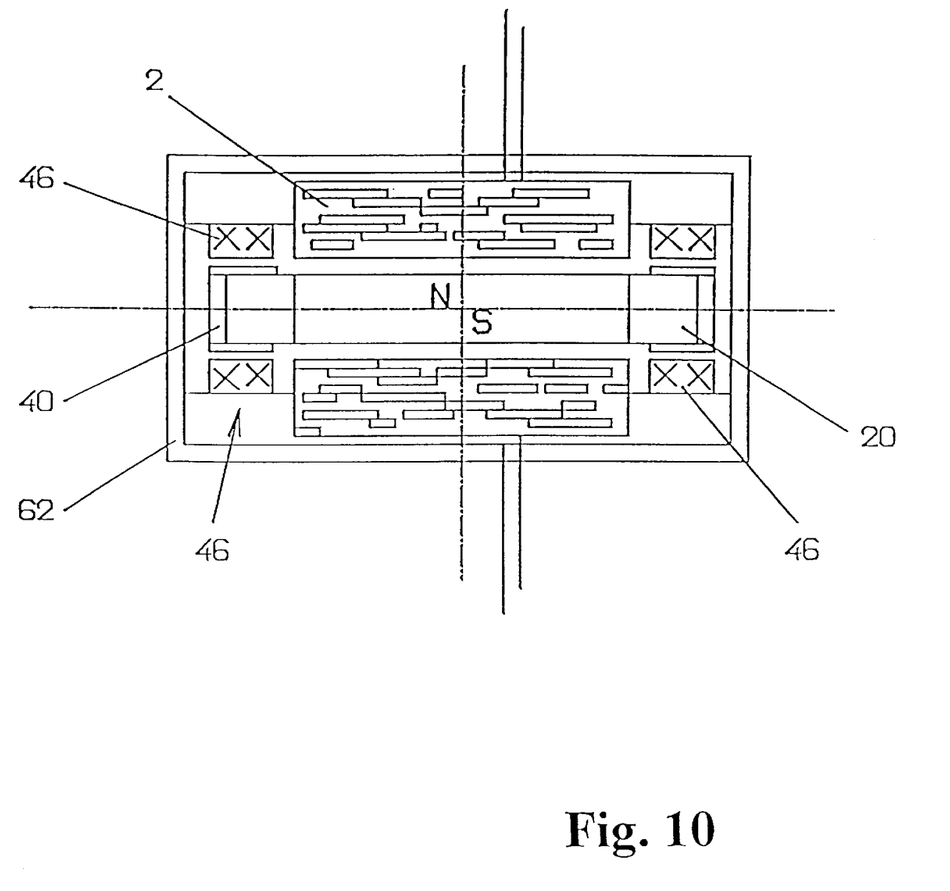
FIG. 10 shows a two-sided radial bearing with polygon mirror in sandwich geometry.

FIG. 10 shows a scanner outfitted with a polygon mirror 40 and in a sandwich-type construction with a rotary superconducting magnetic bearing such as is shown in principle in FIG. 2. However, a motor drive 46 is provided in this case and a mirror polygon is formed directly at the rotor part 20. For this purpose, a ring which carries the mirror elements of the polygon mirror 40 on the outside is arranged at the outer circumference of the rotor part 20. Further, in contrast to FIG. 2, two disks of superconducting material 2 are provided in a mirror-inverted arrangement with respect to the permanent magnet of the disk-shaped rotor part. The superconducting material 2, the rotor 20 and the stator coils 46 which are arranged in a mirror-inverted manner are received in a tightly closing housing 62.

Particularly stable bearings and drive ratios are provided in a radially expanding bearing because of the parallel symmetric arrangement of the stator part with respect to the end face of the rotor part. The arrangement shown in the drawing is also suitable for mass production.

The preceding examples show the variety of constructions of the magnetic bearing according to the invention. The orientation of the anisotropic superconducting material with respect to the maximum magnetic flux anchoring determined by the c-axis has the substantial share of increased bearing capacity. As was shown, stiffness and damping can be varied to a large degree by means of the crystallite size, the size of the gap 4 and by means of intermediate rings 16. A further advantage of the multigrain structure consists in a strong anchoring effect for external magnetic fields, so that an exact positioning and/or repositioning of magnetic rotors in relation to the stator in the range of 0.1 $\mu$m is achieved, which can be attributed to the influence of the grain boundaries in the remanent frozen state of the superconductor.

While the foregoing description and drawings represent the present invention, it will be obvious to those skilled in the art that various changes may be made therein without departing from the True spirit and scope of the present invention.

What is claimed is:

1. A magnetic bearing comprising:
    a first part being mounted magnetically relative to a second part;
    said second part having a Type II superconducting material containing an anisotropic crystal or a plurality of grains formed of said anisotropic crystal;
    said crystal being anisotropic in that the superconducting current flows in current-carrying planes;
    said first part having a configuration of magnets with which the superconducting material interacts;
    said crystal itself or the plurality of grains formed of said anisotropic crystal facing the first part with normals to the current-carrying planes;
    and a polygon mirror which is fastened to said first part.

2. The magnetic bearing according to claim 1, wherein the configuration has a plurality of magnets in series along a shaft, wherein each magnet is oriented with its poles oppositely aligned relative to the next magnet in the series, and wherein the normals on the current-carrying planes arc directed vertically to this shaft, wherein a distance of more than 0.1 mm is provided between the first and second part.

3. The magnetic bearing according to claim 2, wherein the first part is mounted so as to be rotatable relative to the second part, wherein the shaft is the axis of rotation and the normals on the current-carrying planes are directed radial to the axis of rotation.

4. The magnetic bearing according to claim 2, wherein the distance between the first and second part is between 1 mm and 10 mm.

5. The magnetic bearing according to claim 4, wherein the distance between the first and second part is between 2 mm and 7 mm.

6. The magnetic bearing according to claim 1, wherein the first part is constructed as a rotor and the second part is constructed as a stator of an electric motor.

7. The magnetic bearing according to claim 1, wherein the grains have a grain size between 2 mm and 20 mm.

8. The magnetic bearing according to claim 1, wherein the crystal contains or is made of an X-barium-copper-oxygen compound, where X is a rare earth metal from the group Y, Sm, Nd, Tb.

9. The magnetic bearing according to claim 8, wherein the crystal contains or is made of a compound $Y_x Ba_2 Cu_3 O_{(8-x)}$.

10. The magnetic bearing according to claim 1, wherein a cooling system is provided in the form of a small refrigeration machine which cools the second part.

11. The magnetic bearing according to claim 10, wherein the small refrigeration machine is a Stirling engine.

12. The magnetic bearing according to claim 1, wherein the first and second part are enclosed by an air-tight housing.

13. The magnetic bearing according to claim 12, wherein the housing is evacuated until attaining a pressure of less than $10^{-4}$ Pa.

14. The magnetic bearing according to claim 12, wherein the housing is filled with a gas having a molecular weight of less than 28.

15. The magnetic bearing according to claim 12, wherein the housing is filled with helium.

16. The magnetic bearing according to claim 1, wherein the magnets in the first part are permanent magnets.

17. A motor with a magnetic bearing, according to claim 1, comprising:
    a rotor being, magnetically mounted relative to a stator;
    said stator, as second part of the magnetic bearing, having a Type II superconducting material which contains an anisotropic crystal or a plurality of grains formed of the latter;
    in the superconducting state, current flowing in the latter in every grain flows in a current-carrying plane of the grain, and the crystal, or all crystals in the case of a plurality of grains, being oriented with the normals on the current-carrying planes to the axis of rotation of a rotor as first part of the magnetic bearing.

18. A method of using the motor of claim 17, comprising the step of:
    driving a polygon mirror which is fastened to the rotating shaft of the motor.

19. A method of using the motor of claim 17, comprising the step of:
    using the motor with a magnetic bearing and with a housing for driving a polygon mirror in a video system by which a light bundle provided for showing image points of a video system is scanned cyclically with respect to time, wherein the housing encloses the bearing as well as the polygon mirror and one or two windows are provided in the housing for the scanning light bundle to enter and exit.

20. A magnetic bearing comprising:
    a first part further comprising a configuration of magnets and being mounted magnetically relative to a second part;
    said second part being a Type II superconducting material which can be cooled to below its critical temperature by a connected cooling system;
    said superconducting material containing a plurality of grains, each comprising an anisotropic crystal;

current flowing in the superconducting state flowing in every grain in a current-carrying plane of the grain;

said superconducting material, in terms of its structure, being a melt-textured multigrain material with grain sizes in the range of 2 mm to 20 mm;

a preferred direction of the current-carrying planes being adjusted so that an external magnetic flux direction of the magnetic flux lines of the configuration of magnets runs parallel to the normals of the current-carrying planes of the grains and a polygon mirror which is fastened to said first part.

21. The magnetic bearing according to claim 20, wherein the configuration has a plurality of magnets in series along a shaft, wherein each magnet is oriented with its poles oppositely aligned relative to the next magnet in the series, and wherein the normals on the current-carrying planes are directed vertically to this shaft, wherein a distance of more than 0.1 mm is provided between the first and second part.

22. The magnetic bearing according to claim 21, wherein the first part is mounted so as to be rotatable relative to the second part, wherein the shaft is the axis of rotation and the normals on the current-carrying planes are directed radial to the axis of rotation.

23. The magnetic bearing according to claim 21, wherein the distance between the first and second part is between 1 mm and 10 mm.

24. The magnetic bearing according to claim 23, wherein the distance between the first and second part is between 2 mm and 7 mm.

25. The magnetic bearing according to claim 20, wherein the first part is constructed as a rotor and the second part is constructed as a stator of an electric motor.

26. The magnetic bearing according to claim 20, wherein the crystal contains or is made of an X-barium-copper-oxygen compound, where X is a rare earth metal from the group Y, Sm, Nd, Tb.

27. The magnetic bearing according to claim 26, wherein the crystal contains or is made of a compound $Y_x Ba_2 Cu_3 O_{(8-x)}$.

28. The magnetic bearing according to claim 20, wherein a cooling system is provided in the form of a small refrigeration machine which cools the second part.

29. The magnetic bearing according to claim 28, wherein the small refrigeration machine is a Stirling engine.

30. The magnetic bearing according to claim 20, wherein the first and second part are enclosed by an air-tight housing.

31. The magnetic bearing according to claim 30, wherein the housing is evacuated until attaining a pressure of less than $10^{-4}$ Pa.

32. The magnetic bearing according to claim 30, wherein the housing is filled with a gas having a molecular weight of less than 28.

33. The magnetic bearing according to claim 30, wherein the housing is filled with helium.

34. The magnetic bearing according to claim 20, wherein the magnets in the first part are permanent magnets.

35. A motor with a magnetic bearing, according to claim 20, comprising:

a rotor being magnetically mounted relative to a stator;

said stator, as second part of the magnetic bearing, having a Type II superconducting material which contains an anisotropic crystal or a plurality of grains formed of the latter;

in the superconducting state, current flowing in the latter in every grain flows in a current-carrying plane of the grain, and the crystal, or all crystals in the case of a plurality of grains, being oriented with the normals on the current-carrying planes to the axis of rotation of a rotor as first part of the magnetic bearing.

36. A method of using the motor of claim 35, comprising the step of:

driving a polygon mirror which is fastened to the rotating shaft of the motor.

37. A method of using the motor of claim 35, comprising the step of:

using the motor with a magnetic bearing and with a housing for driving a polygon mirror in a video system by which a light bundle provided for showing image points of a video system is scanned cyclically with respect to time, wherein the housing encloses the bearing as well as the polygon mirror and one or two windows are provided in the housing for the scanning light bundle to enter and exit.

* * * * *